(12) United States Patent
Schaefer et al.

(10) Patent No.: US 9,226,098 B2
(45) Date of Patent: Dec. 29, 2015

(54) NEAR FIELD COMMUNICATION SYSTEM AND METHOD FOR PROVIDING AN EFFECTIVE ANTENNA THAT IS ADAPTABLE FOR DIFFERENT ANTENNA CONFIGURATIONS AND LOCATIONS OF A PORTABLE DEVICE

(71) Applicant: MAGNA ELECTRONICS SOLUTIONS GMBH, Wetzlar (DE)

(72) Inventors: Marc Schaefer, Wetzlar (DE); Stefan Graf, Wetzlar (DE)

(73) Assignee: MAGNA ELECTRONICS SOLUTIONS GMBH, Wetzlar (DE)

( * ) Notice: Subject to any disclaimer, the term of this patent is extended or adjusted under 35 U.S.C. 154(b) by 0 days.

(21) Appl. No.: 14/063,388

(22) Filed: Oct. 25, 2013

(65) Prior Publication Data

US 2015/0118957 A1 Apr. 30, 2015

(51) Int. Cl.
*H04B 5/00* (2006.01)
*H04W 4/00* (2009.01)

(52) U.S. Cl.
CPC ............ *H04W 4/008* (2013.01); *H04B 5/0081* (2013.01); *H04B 5/0037* (2013.01); *H04B 5/0075* (2013.01)

(58) Field of Classification Search
CPC .. H04B 5/0037; H04B 5/0093; H04B 5/0012; H04B 5/0087; H04B 5/0062; H04B 5/0081; H04B 5/0031; H04B 5/0075; H04B 5/02; H04B 5/00; H04B 5/06; H04B 5/0056; H04B 5/0068; H04B 5/0006; H04B 5/0025
See application file for complete search history.

(56) References Cited

U.S. PATENT DOCUMENTS

| 2007/0218951 | A1 | 9/2007 | Risheq et al. | |
| 2011/0156640 | A1 | 6/2011 | Moshfeghi | |
| 2012/0139358 | A1* | 6/2012 | Teggatz et al. | 307/104 |
| 2012/0235506 | A1* | 9/2012 | Kallal et al. | 307/104 |
| 2012/0256585 | A1 | 10/2012 | Partovi et al. | |
| 2012/0299389 | A1* | 11/2012 | Lee et al. | 307/104 |
| 2013/0005251 | A1 | 1/2013 | Soar | |
| 2013/0119773 | A1 | 5/2013 | Davis | |

OTHER PUBLICATIONS

Extended European Search Report for corresponding European patent Application No. 13005094.1, dated Jun. 2, 2014.

* cited by examiner

*Primary Examiner* — Golam Sorowar
(74) *Attorney, Agent, or Firm* — Gardner, Linn, Burkhart & Flory, LLP (57) ABSTRACT

A near field communication (NFC) system includes a plurality of coils for coupling to an antenna of a portable device, wherein each two adjacent coils are partly overlapped with one another; a multiplexer selectively enabling at least one of the coils to build a communication with the antenna, wherein the coils enabled by the multiplexer are selected to have a best coupling effect with the antenna and are combined into an effective antenna; and at least one adaptation network for adapting an input/output of the effective antenna.

18 Claims, 8 Drawing Sheets

NEAR FIELD COMMUNICATION SYSTEM AND METHOD FOR PROVIDING AN EFFECTIVE ANTENNA THAT IS ADAPTABLE FOR DIFFERENT ANTENNA CONFIGURATIONS AND LOCATIONS OF A PORTABLE DEVICE

BACKGROUND OF THE INVENTION

1. Field of the Invention

The present invention relates to a near field communication system. In particular, the present invention relates to a near field communication system ensuring that the communication is stable regardless of the location of the antenna of a portable device.

2. Description of the Related Art

Near field communication (NFC) is a wireless and contactless communication technology, and it is widely used in many apparatus and devices; such as smart card, smart phone or tablet computer. The NFC technology uses magnetic induction to transfer data from one antenna to another antenna over a very short distance, usually no more than a few inches. Namely, an initiator device uses an antenna to generate an electro-magnetic (EM) field, and a target device which is positioned in the "near-field" area of the generated EM field would use the antenna of the target device (such as a coil) to couple with the antenna of the initiator device, so that data can be transferred via their coupling. Therefore, the NFC is convenient for transmitting/receiving data by simply placing the initiator NFC device close to the target NFC device and more and more mobile devices with integrated NFC antennas are available. For example, users can put their smart phone (having integrated NFC antenna) on or close to a target device and the information of the target device will show on the screen of the smart phone.

However, the location of the antenna integrated within the NFC device depends on different manufacturers and is not standardized. This would cause a problem because the antenna within the initiator NFC device has to be placed right over the antenna of the NFC target device to ensure a proper EM field coupling and therefore a stable data transfer between the devices. Therefore, how to ensure a stable data transmission under the random position of the NFC devices becomes a problem.

Figure 1:
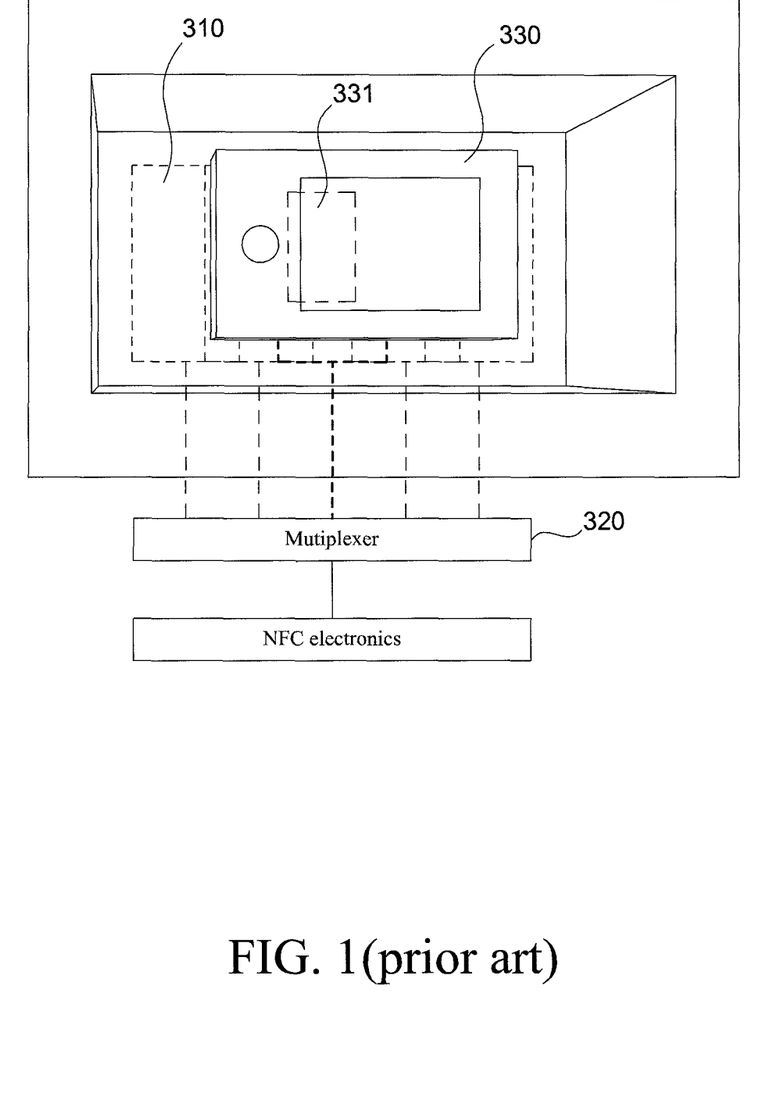
FIG. 1 shows a traditional initiator NFC device placed on a target NFC device having multi-coil antenna (prior art).

One of the approaches is to use a large antenna to cover the whole surface of the target NFC device for proper coupling to the antenna of the initiator NEC device. This solution is not ideal, because two NFC antennas with completely different size lead to a decreased coupling efficiency. Another solution is to use a multi-coil antenna to replace the large antenna mentioned above. As FIG. 1 shows, there are plurality of coils 310 overlapped with one another to form a multi-coil antenna, and each of the coils 310 is connected to a multiplexer 320. The coil in the middle has the best coupling effect with the antenna 331 of the initiator NFC device 330 and is enabled by the multiplexer to communicate with the initiator NFC device 330. The enabled coil is drawn in bold dotted line as shown in FIG. 1. However, this approach still has shortcomings. Namely, if the antenna 331 of the initiator NEC device 330 is placed across more than one coil, and the multiplexer still only enables one coil to communicate with the initiator NEC device 330, it will result in that the antenna 331 of the initiator NFC device 330 could not receive enough power from the enabled coil. Thus, the coupling effect between the only one enabled coil and the antenna 331 of the initiator NFC device 330 is not strong enough to maintain a stable connection. In addition, the electromagnetic power generated by the enabled coil may induce disturbance coupling effects with the nearby metals or other coils, and the disturbance coupling effects may decrease the coupling efficiency between the antenna 331 of the initiator NFC device 330 and the enabled coil of the target NFC device.

Therefore, there still remains another approach to solve the problem of how to build a stable communication between two NFC antennas to ensure a stable data transmitting regardless of the exact positioning of the initiator NFC device.

SUMMARY OF THE INVENTION

The purpose of the present invention is to overcome the shortcomings mentioned above and to provide a near field communication system, apparatus and operation method thereof.

Therefore, the present invention is to provide a near field communication system, comprising: a plurality of coils, which are used for coupling to an antenna of a portable device, wherein each two adjacent coils are partly overlapped with one another; a multiplexer, which is electronically connected to the coils, and selectively enables at least one of the coils to build a communication with the antenna, wherein the coils enabled by the multiplexer are selected to have a best coupling effect with the antenna and are combined into an effective antenna; and at least one adaptation network, which is electronically connected to the multiplexer and is used to adapt an input/output of the effective antenna.

In a preferable embodiment, the size of the effective antenna is equal or similar to that of the antenna of the portable device.

In a preferable embodiment, wherein the best coupling effect is evaluated based on a radio frequency field strength induced by the coupling of each coil and the antenna of the portable device.

In a preferable embodiment, wherein the best coupling effect is evaluated based on testing a communication channel by sending a packet information through each coil to the antenna of the portable device, and checking an accuracy of a received answer.

In a preferable embodiment, wherein the multiplexer enables more than two coils arranged in parallel but the enabled coils are not overlapping.

In a preferable embodiment, the said multiplexer is electronically connected between the adaptation network and the coils.

In a preferable embodiment, the said adaptation network is electronically connected between the multiplexer and each of the coils.

In a preferable embodiment, the system further comprises a plane for placing the portable device, and the coils covers whole area of the plane.

In a preferable embodiment, the system further comprises a wireless charging unit having at least one charging coil coupled to the antenna of the portable device for wireless charging the portable device.

In a preferable embodiment, further comprises a mobile communication module which includes a mobile communication antenna operated in frequencies used by GSM, UMTS, LTE or GPS, a compensator and/or an amplifier, and a far field antenna is coupled to the mobile communication antenna via the compensator and/or the amplifier.

Another aspect of the present invention is to provide a method for automatically optimizing NFC coupling of an antenna of a portable device and an apparatus containing a plurality of coils, wherein each two adjacent coils are partly overlapped with one another, the method comprises: determining a configuration of coils having a best coupling effect with the antenna of the portable device; enabling at least one of the coils to combine into an effective antenna by a multiplexer according to the configuration of coils; and adapting an input or an output of the effective antenna via at least one adaptation network.

In a preferable embodiment of the method of the present invention, wherein the best coupling effect is determined by following steps: measuring a radio frequency field strength which is induced by the coupling of each coil and the antenna of the portable device; and determining the configuration of coils which has the strongest radio frequency field strength.

In a preferable embodiment of the method of the present invention, wherein the best coupling effect is determined by following steps: sending a packet information through each coil to the antenna of the portable device; receiving an answer to the packet information from the antenna of the portable device; checking an accuracy of the received answer; and determining the configuration of coils which has the most accurate matching.

In a preferable embodiment of the method of the present invention, wherein the multiplexer enables more than two coils arranged in parallel but the enabled coils are not overlapping.

In a preferable embodiment of the method of the present invention, the said multiplexer is electronically connected between the adaptation network and the coils.

In a preferable embodiment of the method of the present invention, the said adaptation network is electronically connected between the multiplexer and each of the coils.

In a preferable embodiment of the method of the present invention, wherein the apparatus further comprises a plane for placing the portable device, and the coils covers whole area of the plane.

In a preferable embodiment, the size of the effective antenna is equal or similar to that of the antenna of the portable device.

By using the automatic coupling optimized NFC system, apparatus and method of the present invention, the portable device can be placed on any site of the area covered by the coils, and the multiplexer selectively enables at least one coils to form an effective antenna with the adaptation network adapts the input or output of the effective antenna to adjust better connection between the effective antenna and the antenna of the portable device. In addition, since the multiplexer enables the coils having the best coupling effect with the antenna, it theoretical means that the enabled coils (effective antenna) having the same size with the antenna of the mobile device because only the antennas having similar size would achieve the best coupling effect. Therefore, since the multiplexer chooses the coils based on the site the antenna of the portable device and the size of the effective antenna is equal or similar to that of the antenna of the portable device and the adaptation network further compensates the different antenna layouts and disturbances coupling effects between nearby coils, the system, apparatus and method of the present invention achieve the goal that the coupling effect between the effective antenna and the antenna the portable device is stable regardless of the position of the antenna the portable device.

To improve understanding of the invention of the disclosure, the techniques employed in the patent invention to achieve the foregoing problems, characteristics and effects thereof are described hereinafter by the way of examples with reference to the accompanying drawings.

DETAILED DESCRIPTION OF THE PREFERRED EMBODIMENTS

In the following detailed description, only certain exemplary embodiments of the present invention are shown and described, by way of illustration. As those skilled in the art would recognize, the described exemplary embodiments may be modified in various way all without departing from the spirit or scope of the present invention. Accordingly, the drawing and description are to be regarded as illustrative in nature without restriction.

The terms "a" and "an" refer to one or to more than one (i.e., to at least one) of the grammatical object of the article.

The technical contents of the present invention will become apparent with the detailed description of preferred embodiment.

Figure 2:
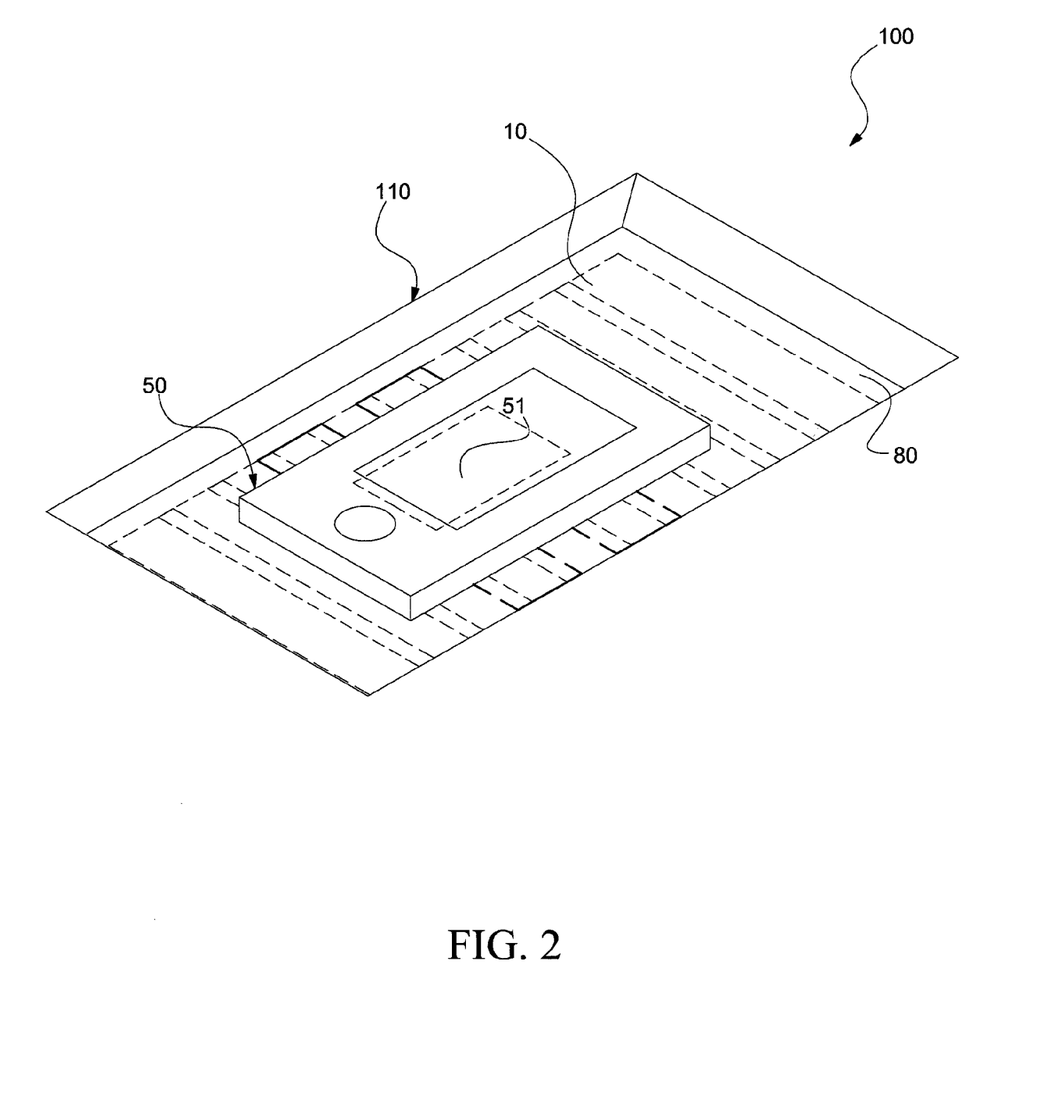
FIG. 2 shows a schematic diagram of a near field communication (NFC) system according to an embodiment of the present invention.
Figure 3:
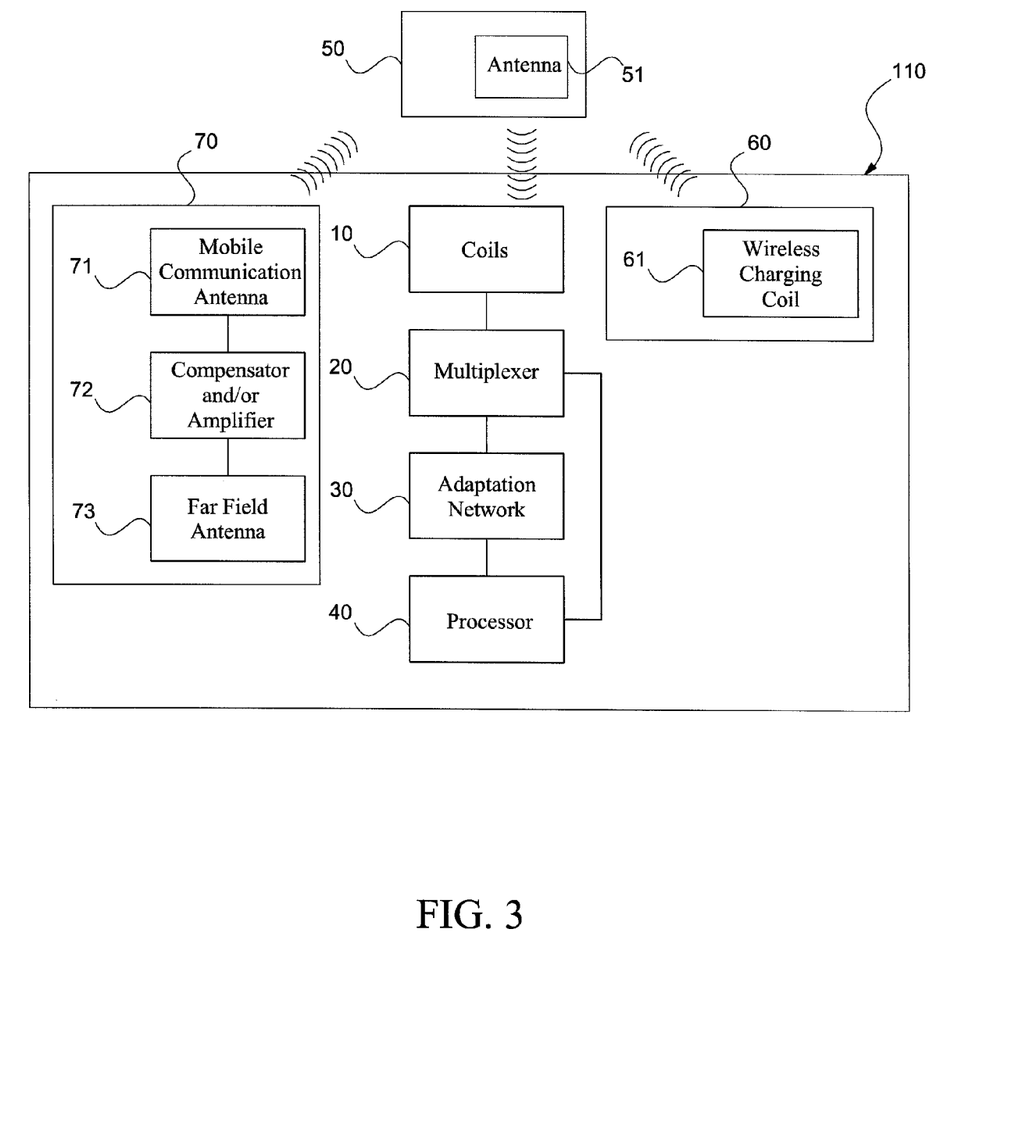
FIG. 3 shows a block diagram of the NFC system shown in FIG. 2.

Please refer to FIG. 2 and FIG. 3. FIG. 2 schematically illustrates a near field communication (NFC) system according to an embodiment of the present invention. FIG. 3 shows a block diagram of the NFC system shown in FIG. 2. The NFC system 100 comprises a communicating apparatus 110 and a portable device 50. The communicating apparatus 110 comprises: a plurality of coils 10, a multiplexer 20, a processor 40 and at least one adaptation network 30.

The portable device 50 has an antenna 51 for coupling to the coils 10 of the communicating apparatus 110 for transceiving data through a near field communication there between. The data can be e-cash trading information, querying signal of product content, MP3 sound stream or other kinds of data. The communicating apparatus 110 might further comprise a RF module (not shown) for mixing the data with a carrying wave into a RF signal or filtering a received RF signal to the data. The RF module might be installed in a position after the processor 40 because the data is provided from the processor 40, or the RF module might be installed in a position after another data source (such as a storing unit within the communicating apparatus 110) either, without any restriction. The RF module mainly comprises a mixer, filter, amplifier, etc. The structure and components of the RF module is well-known for an ordinary skill in the art, and herein without further illustration.

The communicating apparatus 110 further comprises a communicating plane 80 for placing the portable device 50, and the coils 10 covers whole area of the communicating plane 80. In one embodiment, each two adjacent coils 10 are partly overlapped with one another. The geometric layout, the layout pattern, the number or the shape of the coils 10 is only for exemplary illustration without restriction. In one embodiment, the coils can be ordered in other directions.

According to the NFC system 100 provided in the present application, the NFC system 100 can automatically optimize the coupling between the communicating apparatus 110 and the portable device 50. The term "automatically optimize the coupling" means that the NFC system 100 has self-adjusting ability for approaching the best transmission effects based on several conditions, such as the site where an antenna 51 of the portable device 50 is placed, the size of the antenna 51 and/or the coupling effects between different coils, etc. In the present invention, the portable device 50 can be placed on any site of the communicating plane 80 of the communicating apparatus 110, regardless of the exact position that the antenna 51 disposed on the portable device 50. Specifically, the NFC system 100 can automatically improve the coupling by using the multiplexer 20 and the adaptation network 30.

Figure 4:
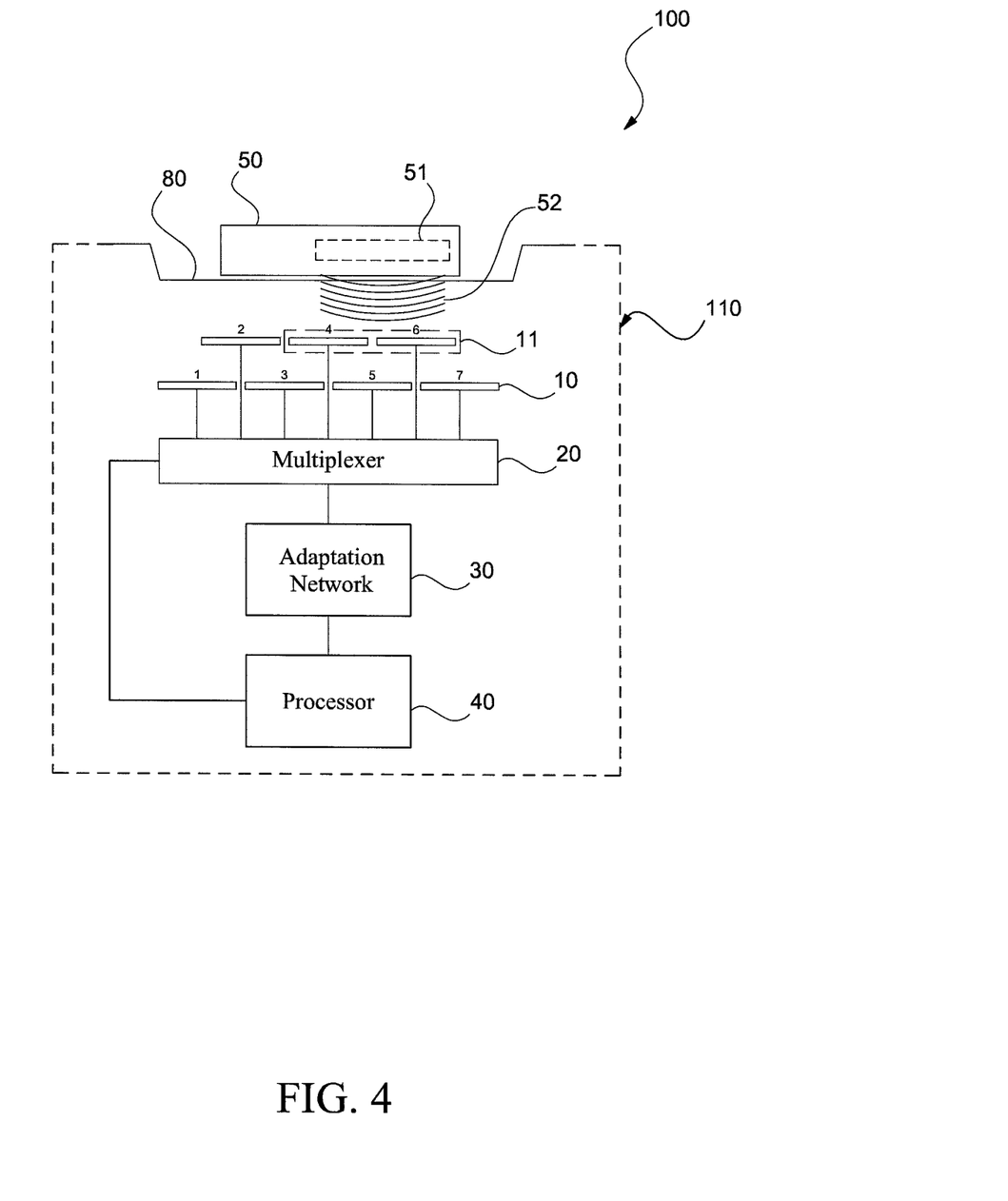
FIG. 4 shows a first embodiment of a communicating apparatus of the NFC system of the present invention.

Please refer to FIG. 4, which shows a first embodiment of a communicating apparatus of the NFC system of the present invention. In this embodiment, one adaptation network 30 is electronically connected between the multiplexer 20 and the processor 40. The following will use this embodiment to describe how the NFC system 100 of the present invention works.

When the portable device 50 is placed on the communicating plane 80 of the communicating apparatus 110, an EM field 52 is generated between the antenna 51 of the portable device 50 and at least one of the coils 10. The strength/density distribution of the EM field 52 is related to the size of the antenna 51. Under this concept, at least one of the coils 10 is combined into an effective antenna 11 having the size equal or similar to that of the antenna 51 of the portable device 50 for reaching the best coupling effect. The term "the size of the effective antenna 11 is equal or similar to that of the antenna 51" used herein means that the physical sizes of the effective antenna 11 and antenna 51 of the portable device 50 are able to generate equal or similar strength/density distribution of the EM fields to improve the coupling effect between the antenna 51 and the effective antenna 11.

The multiplexer 20 has several passages electronically connected to the coils 10, wherein the passages include two conditions: inaccessible and accessible. When the passage is under the inaccessible condition, it will not allow the coils 10 to couple with the antenna 51; on the contrary, if the passage is under the accessible condition, it can lead RF signal (transferred from data by the RF module) passing to the coils 10 and then the coils 10 couples to the antenna 51 of the portable device 50 to build a communication through the EM field.

The above mentioned condition of the passages of the multiplexer 20 is controlled by the processor 40. The processor 40 determines a configuration of coils having a best coupling effect with the antenna 51 of the portable device 50 and generates a control signal based on the configuration of coils, namely the selection of the combination of the enabled coils. The control signal is transmitted to the multiplexer 20 via an isolated wire between the processor 40 and the multiplexer 20, or the multiplexer 20 can also be connected with the processor 40 via several control lines (I/O) or a communication interface like IIC, SPI, UART, without restriction. One approach for determining the configuration of coils having the best coupling effect is to evaluate a radio frequency field strength induced by the coupling of each of the coils 10 and the antenna 51. Another approach is to test the communication channel by sending a packet information from at least one of the coils 10 to the antenna 51 and check whether the response received is correct. More specifically, each of the coils 10 transmit the packet information and receive an answer from the antenna 51 of the portable device 50, and then the processor 40 evaluates the accuracy of the received answer and generates the control signal corresponding to the coils 10 with the most accurate matching of the packet information and the answer. The method of evaluating the radio frequency field strength might be preferable because the method of testing the communication channel might take times; however, the method of testing the communication channel can get more accurate results. Persons having ordinary skill in the art can also use other known methods to evaluate the coupling effect without limitation.

Figure 5:
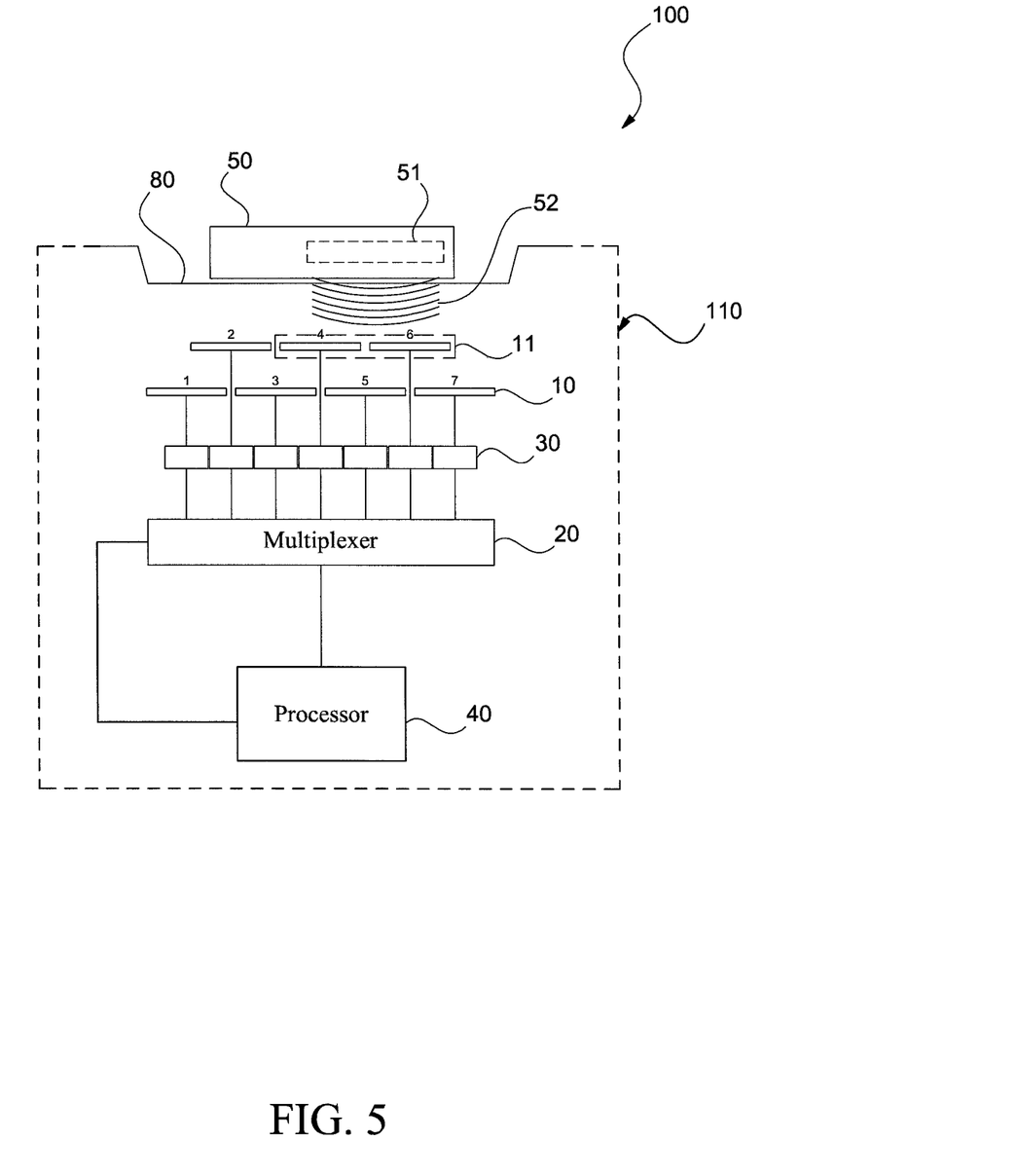
FIG. 5 shows a second embodiment of a communicating apparatus of the NFC system of the present invention.

After detection of the coils 10 having the best coupling effect with the antenna 51, as FIG. 4 and FIG. 5 show, the processor 40, for example, determines that the coils 4 and 6 combined together have the best transceiving capabilities, and then it generates a control signal to the multiplexer 20 to enable the coils 4 and 6 and disenable coils 1, 2, 3, 5 and 7. Thus, coils 4 and 6 form an effective antenna 11 to communicate with the antenna 51. As the figures show, coils 4 and 6 are arranged in parallel but are not overlapped with each other. As the figures show, choosing coils 5 and 6 to form an effective antenna might also achieve the condition that the size of the effective antenna is equal or similar to that of the antenna 51 of the portable device 50. However, the magnetic field of the effective antenna may decrease because two overlapping coils offset the magnetic field. Thus, the effective antenna composed by non-overlapping coils is preferred.

The effective antenna 11 would be disturbed by metals nearby, such as the coils 10 which are not enabled, or the circuit within the portable device 50, which may cause a frequency shift of the communicating frequency of the effective antenna 11 and make the coupling effect deteriorated. Beside, more than one coils being cooperated to an effective antenna 11, the enabled coils induce electromagnetic field with each other and then disturb the communication between the effective antenna 11 and the antenna 51 of the portable device 50. Therefore, the communicating apparatus 110 of the present invention incorporate the adaptation network 30 to reduce the above mentioned disturbing factors. The adaptation network 30 is an assembly consisting of many kinds of circuits, which is used to match the impedance of the effective antenna 11 to the high frequency input of the communicating apparatus 110. Therefore, the adaptation network 30 is configured to adapt the coils 10 based on an input or an output from the coils 10, such as feeding power, input impedance, output impedance, etc. The purpose of the adaptation network 30 is to implement the compensation of different layouts of the coils 10, and further to balance the different coupling effect between the enabled coils 10, and to compensate the disturbance generated from the metal nearby. Thus, the effective antenna 11 is dynamically configurable via the adaptation network 30. For example, the adaptation network 30 uses an adapting signal to optimize the output/input of the effective antenna 11 for voltage, and current, so that the impedance or the inductance of the effective antenna 11 may be dynamically controlled.

Please refer FIG. 5, which shows a second embodiment of a communicating apparatus of the NFC system of the present invention.

The setting and the numbers of the adaptation network 30 are optionally variable. In the exemplary embodiment of FIG. 4, one adaptation network 30 is electronically connected to the multiplexer 20, and the adaptation network 30 adapts the impedance or inductance of the effective antenna 11 which are enabled by the multiplexer 20. Namely, the adaptation network 30 is electronically connected between the multiplexer 20 and the processor 40. In the exemplary embodiment of FIG. 5, each of coils 10 is electronically connected with the adaptation network 30. Namely, the adaptation network 30 is electronically connected between the multiplexer 20 and each of the coils 10. The setting of the adaptation network 30 shown as FIG. 5 is more preferable because the adaptation network 30 has the better tuning possibilities for each coil 10.

Referring back to FIG. 3, the communicating apparatus 110 further comprises a wireless charging unit 60 which charges the portable device 50 by at least one charging coil 61 coupled to the antenna 51 of the portable device 50 for transmitting electromagnetic power, and the charging coils 61 can be interleaved or below the coils 10. It should be noted that the portable device 50 normally has also separated coils for NFC and wireless charging. For other applications, the automatic coupling optimized NFC system 100 further comprises a mobile communication module 70 which includes a mobile communication antenna 71, a compensator and/or an amplifier 72, and a far field antenna 73 coupled to the mobile communication antenna 71 via the compensator and/or the amplifier 72. The mobile communication antenna 71 is operated in frequencies used by GSM (Global System for Mobile Communications), UMTS (Universal Mobile Telecommunications System), LTE (Long Term Evolution) or GPS (Global Positioning System), and the mobile communication antenna 71 can be at the sides, above or around the coils 10. The far field antenna 73 could be a roof antenna placed on a vehicle, or a dish antenna placed on a building, without restriction. Therefore, the RF signal from the portable device 50 could be broadcasted to other radio receiver by antenna coupling with the mobile communication antenna 71. It might be necessary to install a compensator and/or an amplifier 72 between the mobile communication antenna 71 and the far field antenna 73 to feed enough power for broadcasting to a lager range.

Figure 6:
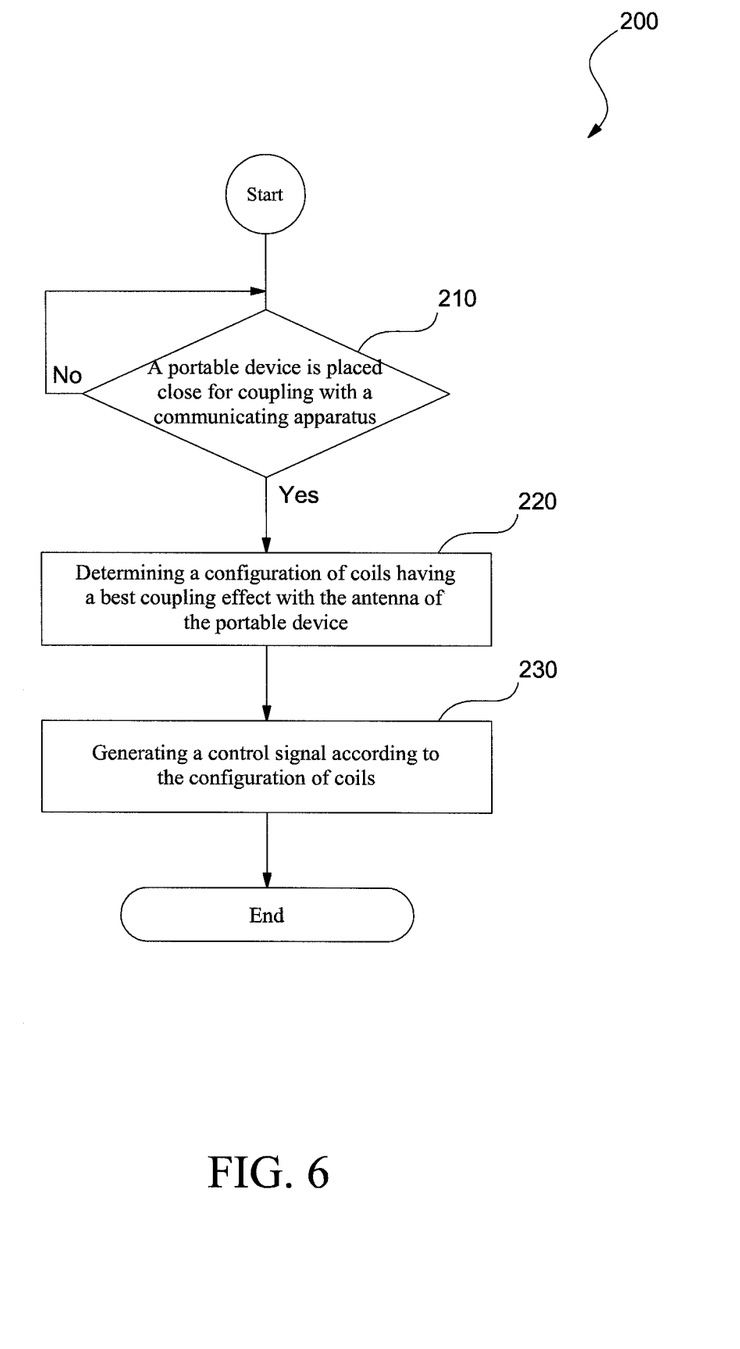
FIG. 6 shows a flow chart explaining operations of the method of the present invention.
Figure 7:
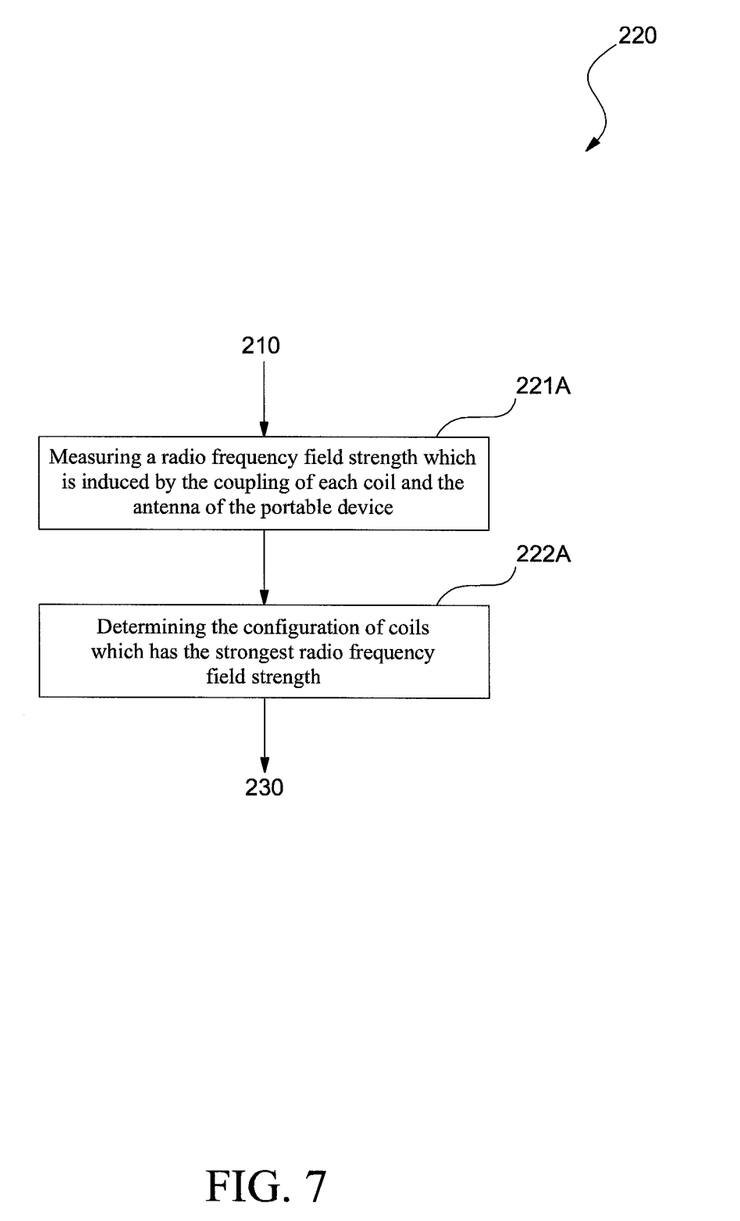
FIG. 7 shows the steps for determining the configuration of coils having the best coupling effect base on the radio frequency field strength of the method of the present invention.
Figure 8:
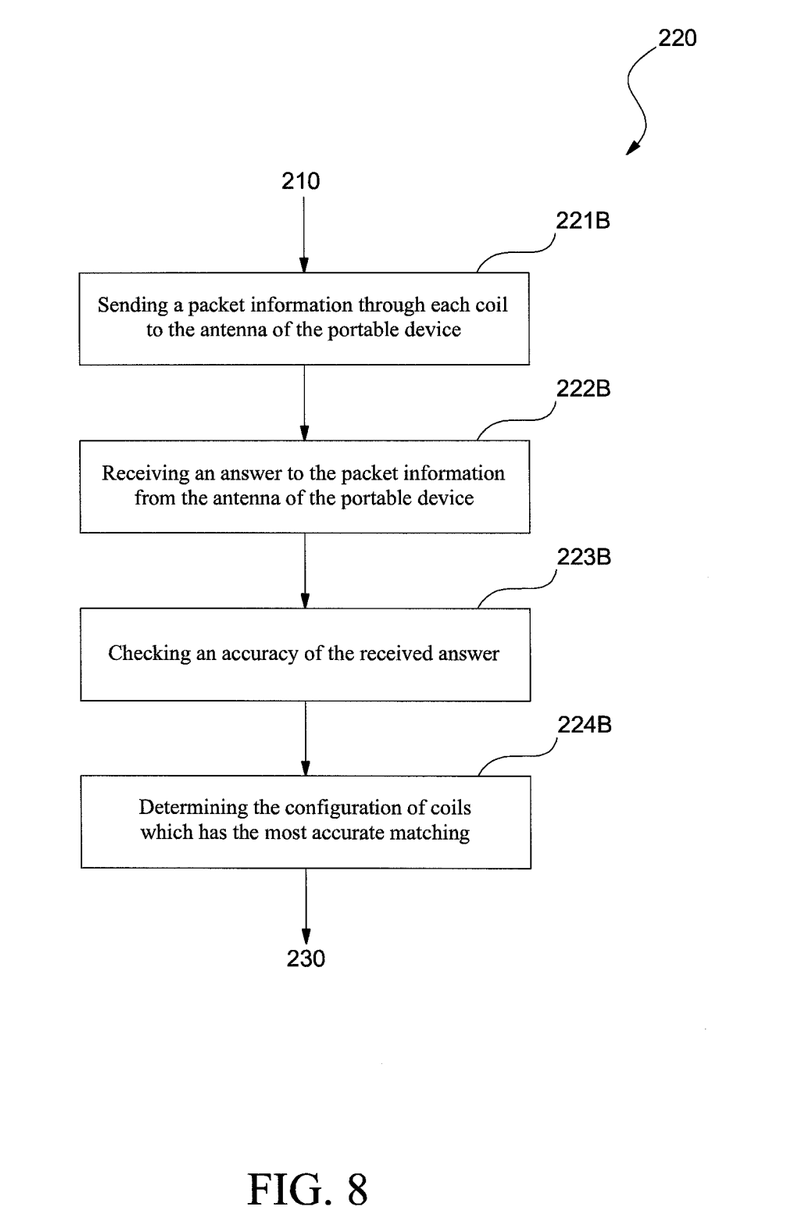
FIG. 8 shows the steps for determining the configuration of coils having the best coupling effect base on the matching between the packet information and the response of the method of the present invention.

FIG. 6 shows a flow chart to explain the operations of the method 200 of the present invention, and FIG. 7 and FIG. 8 show flow charts of two ways for determining the configuration of coils having the best coupling effect.

Referring to FIG. 6, the method 200 is for automatically optimizing NFC coupling of an antenna of a portable device and a communicating apparatus containing a plurality of coils, wherein each two adjacent coils are partly overlapped with one another. At first, a portable device is placed close for coupling with a communicating apparatus is determined (block 210). The event of block 210 triggers the next step: determining a configuration of coils having a best coupling effect with the antenna of the portable device (block 220) and then generating a control signal according to the configuration of coils (block 230). After the control signal is generated, the control signal is transmitted to a multiplexer to enable at least one of the coils according to the configuration of coils (block 240), wherein the coils enabled by the multiplexer are combined into an effective antenna, and the size of the effective antenna is equal or similar to that of the antenna of the portable device. Finally, at least one adaptation network adapts an input or an output of the effective antenna (block 250). Therefore, the apparatus can communicate with the antenna 51 of the portable device 50 through based on the described steps.

There are two exemplary ways for determining the configuration of coils having the best coupling effect in the step of block 220. As shown in FIG. 7, determining the configuration of coils having the best coupling effect comprises the following steps: measuring a radio frequency field strength which is induced by the coupling of each coil and the antenna of the portable device (block 221A), and determining the configuration of coils which has the strongest radio frequency field strength (block 222A).

As shown in FIG. 8, another exemplary way comprises the following steps: sending a packet information through each coil to the antenna of the portable device (block 221B), receiving an answer to the packet information from the antenna of the portable device (block 222B), checking accuracy of the received answer (block 223B), and determining the configuration of coils which has the most accurate matching (block 224B).

In conclusion, using the NFC system, apparatus and method of the present invention, because the multiplexer selectively and automatically enables at least one coils having best coupling effect with an antenna of a portable device, and the adaptation network adapts the input or output of the effective antenna to adjust better connection between the effective antenna and the antenna of the portable device, the portable device can be placed on any site of the surface of the apparatus regardless its exact position of the antenna. Therefore, even different portable devices having different size of the antenna installed in different site, the different portable devices are still suitable for the apparatus and system of the present invention and have stable communication with the apparatus of the present invention.

The method of the present invention can be applied to various industries, such as automotive industry, consumer electronics, household appliances, etc. For example, the NFC system can be installed in a vehicle, and the portable device might be placed in a limitation space (e.g. a mobile phone slot) and to communicate with the target device by the NFC technology. By using the NFC system of the present invention, the communication can be very stable even if the mobile phone is not stationary because of the vehicle is moving.

While the present invention has been described in connection with certain exemplary embodiments, it is to be understood that the invention is not limited to the disclosed embodiment, but, on the contrary, is intended to cover various modifications and equivalent arrangement include within the spirit and scope of the appended claim, and equivalent thereof.

What is claimed is:

1. A near field communication (NFC) system comprising:
a plurality of coils for coupling to an antenna of a portable device, wherein each two adjacent coils of the plurality of coils are partly overlapped with one another, and wherein the plurality of coils are arranged to define a communicating plane for placing the portable device at a multiple locations on the communicating plane;
a multiplexer electronically connected to the plurality of coils, and the multiplexer selectively enabling at least two of the coils to build a communication with the antenna of the portable device, wherein the at least two of the coils enabled by the multiplexer are selected to have a best coupling effect of possible combinations of the plurality of coils with the antenna of the portable device and are combined into an effective antenna that is configured for enhanced communication with the antenna of the portable device, and wherein the best coupling effect is determined responsive to comparison of data communications between the combinations of the plurality of coils and the antenna of the portable device; and
at least one adaptation network being electronically connected to the multiplexer and adapting an input/output of the effective antenna to dynamically control impedance or inductance of the effective antenna for balancing disturbances to the coupling with the antenna of the portable device.

2. The NFC system of claim 1, wherein a size of the effective antenna is equal or similar to that of the antenna of the portable device.

3. The NFC system of claim 1, wherein the best coupling effect is evaluated based on a radio frequency field strength induced by the coupling of each coil of the plurality of coils and the antenna of the portable device.

4. The NFC system of claim 1, wherein the best coupling effect is evaluated based on testing a communication channel by sending a packet information through each coil to the antenna of the portable device, receiving a return signal from the antenna of the portable device, checking an accuracy of the received answer and determining the configuration of coils which has the most accurate matching.

5. The NFC system of claim 1, wherein the multiplexer enables more than two coils arranged in parallel but not overlapping.

6. The NFC system of claim 1, wherein the multiplexer is electronically connected between the adaptation network and the plurality of coils.

7. The NFC system of claim 1, wherein the adaptation network is electronically connected between the multiplexer and each of the plurality of coils.

8. The NFC system of claim 1, wherein the plurality of coils covers a whole area of the communicating plane.

9. The NFC system of claim 1, which further comprises a wireless charging unit having at least one charging coil coupled to the antenna of the portable device for wireless charging the portable device.

10. The NFC system of claim 1, which further comprises a mobile communication module which includes a mobile communication antenna operated in frequencies used by GSM, UMTS, LTE or GPS, a compensator and/or an amplifier, and a far field antenna is coupled to the mobile communication antenna via the compensator and/or the amplifier.

11. A method for automatically optimizing NFC coupling of an antenna of a portable device and an apparatus containing a plurality of coils, wherein each two adjacent coils of the plurality of coils are partly overlapped with one another and arranged to define a communication plane for placing the portable device, the method comprising:
   determining a configuration of the plurality of coils having a best coupling effect with the antenna of the portable device of possible combinations of the plurality of coils, wherein the best coupling effect is determined responsive to comparison of data sent through each of the possible combinations of the plurality of coils to the antenna of the portable device;
   enabling the configuration of the plurality of coils with the determined best coupling effect with the antenna to combine into an effective antenna by a multiplexer according to the configuration of coils, wherein the effective antenna is configured for enhanced communication with the antenna of the portable device; and
   adapting an input or an output of the effective antenna via at least one adaptation network to dynamically control impedance or inductance of the effective antenna for balancing disturbances to the coupling with the antenna of the portable device.

12. The method of claim 11, wherein the best coupling effect is determined by following steps:
   measuring a radio frequency field strength which is induced by the coupling of each coil of the plurality of coils and the antenna of the portable device; and
   determining the configuration of the plurality of coils which has the strongest radio frequency field strength.

13. The method of claim 11, wherein the best coupling effect is determined by following steps:
   sending the packet information through each coil of the plurality of coils to the antenna of the portable device;
   receiving an answer to the packet information from the antenna of the portable device;
   checking an accuracy of the received answer; and
   determining the configuration of coils which has the most accurate matching.

14. The method of claim 11, wherein the multiplexer enables more than two coils arranged in parallel but not overlapping.

15. The method of claim 11, wherein the multiplexer is electronically connected between the adaptation network and the plurality of coils.

16. The method of claim 11, wherein the adaptation network is electronically connected between the multiplexer and each of the plurality of coils.

17. The method of claim 11, wherein the plurality of coils cover the whole area of the communication plane.

18. The method of claim 11, wherein the size of the effective antenna is equal or similar to that of the antenna of the portable device.

* * * * *

UNITED STATES PATENT AND TRADEMARK OFFICE
CERTIFICATE OF CORRECTION

| | | |
|---|---|---|
| PATENT NO. | : 9,226,098 B2 | Page 1 of 1 |
| APPLICATION NO. | : 14/063388 | |
| DATED | : December 29, 2015 | |
| INVENTOR(S) | : Marc Schaefer and Stefan Graf | |

It is certified that error appears in the above-identified patent and that said Letters Patent is hereby corrected as shown below:

In the Specification

Column 1
Line 47, "NEC" should be --NFC--
Line 59, "NEC" should be --NFC--
Line 61, "NEC" should be --NFC--

Signed and Sealed this
Nineteenth Day of July, 2016

Michelle K. Lee
*Director of the United States Patent and Trademark Office*